United States Patent [19]
Van Der Stelt

[11] 3,764,609
[45] Oct. 9, 1973

[54] 1 (DIBENZO [A,D] CYCLOHEPTEN-5-YL) 1-(10,11-DIHYDRO-DIBENZO [A,D] CYCLOHEPTAN-5-YL) AND 1-(DIBENZO [A,D] CYCLOOCTANYL)IMIDAZOLES

[75] Inventor: Cornelis Van Der Stelt, Haarlem, Netherlands

[73] Assignee: N. V. Koninklijke Pharmaceutische Fabrieken v/h Brocades-Stheeman & Pharmacia, Meppel, Netherlands

[22] Filed: June 10, 1971

[21] Appl. No.: 151,913

[30] Foreign Application Priority Data
June 22, 1970 Great Britain .................. 50,246/70
Apr. 30, 1971 Great Britain .................. 12,546/71

[52] U.S. Cl............. 260/309, 260/590, 260/618 D, 425/273
[51] Int. Cl............................................ C07d 49/36
[58] Field of Search .................................. 260/309

[56] References Cited
UNITED STATES PATENTS
3,321,366   5/1967   Mussell et al. ...................... 260/309
3,530,183   9/1970   Kyburz et al. ...................... 260/309
3,637,731   1/1972   Johnson ............................. 260/309
3,647,816   3/1972   Draber et al. ...................... 260/309

FOREIGN PATENTS OR APPLICATIONS
1,170,188   11/1969   Great Britain .................... 260/309

OTHER PUBLICATIONS
Giesemann et al. I Chem. Abst. Vol. 53, Columns 10190–10191 (1959). QD1.A51
Giesemann et al. II Chem. Abst. Vol. 54, columns 15368–15369 (1960). QD1.A51
Chemical Abstracts Vol. 58, Subject Index (A–I), page 1131S (1963) QD1.A51
Gevaert Photo-Producten N.V. Chem. Abst. Vol. 58, columns 2530–2531 (1963). QD1.A51

*Primary Examiner*—Natalie Trousof
*Attorney*—Lawrence S. Levinson, Merle J. Smith and Donald J. Perrella

[57] ABSTRACT

The invention relates to therapeutically useful imidazole derivatives and their acid addition and quaternary ammonium salts, to processes for their preparation and pharmaceutical preparations containing them. The compounds of this invention possess fungicidal activity.

5 Claims, No Drawings

1-(DIBENZO [4,D] CYCLOHEPTEN-5-YL), 1-(DIBENZO [A,D] CYCLOHEPTAN-5-YL) AND 1-(DIBENZO [A,D] CYCLOOCTANYL)IMIDAZOLES

BACKGROUND OF INVENTION

It is known that N-tritylimidazole derivatives show fungicide activities. For instance, South African Pat. No. 68/5392 discloses antimycotics of the general formula:

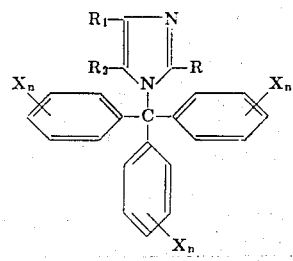

wherein R, $R_1$ and $R_2$ denote hydrogen, lower alkyl radicals and phenyl, and $R_1$ and $R_2$ together may form an anellated benzene ring.

X stands for alkyl groups and for electronegative substituents and n denotes an integer from 0 to 2, and n may have different meanings in the individual benzene rings.

It has been found that also imidazole derivatives of certain tricyclic compounds possess fungicide activities.

DESCRIPTION OF INVENTION

The new imidazole derivatives of the present invention have the general formula:

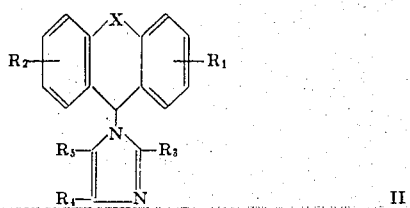

wherein the symbols $R_1$ and $R_2$ are the same or different and each represents a hydrogen or halogen atom or a lower alkyl group, $R_3$, $R_4$ and $R_5$ are the same or different and each represents a hydrogen atom or an alkyl group with at most or a lower alkyl group (preferably methyl or ethyl), X represents a single bond, a -$CH_2$-$CH_2$-, -$CH_2$-$CH_2$-$CH_2$- or -CH=CH- group or a group -CH=CHal, wherein Hal represents a chlorine or bromine atom. The term "lower alkyl" in this specification and the accompanying claims means straight- or branched-chain alkyl groups with at most six carbon atoms.

The imidazole derivatives of formula II have valuable therapeutic properties. They have a strong fungicidal activity against pathogenic fungi such as Candida albicans, Epidermophyton floccosum, Microsporum audouinii, Microsporum canis, Trichophyton mentagrophytes, Trichophyton rubrum and Trichophyton schoenleinii. This activity makes the compounds useful in the treatment of various fungus diseases in humans and animals. Preferred compounds of formula II are those in which X is a -$CH_2$-$CH_2$- or -CH=CH- or -CH=CHal- group, and particularly 1-(5H-dibenzo[a,d]cyclohepten-5-yl)imidazole, and 1-(10,11-dihydro-5H-dibenzo[a,d]cyclohepten-5-yl)imidazole, which show a very strong activity against the pathogenic fungi mentioned above, and 1-(10-chloro-5H-dibenzo[a,d]cyclohepten-5-yl)imidazole, which is the most preferred compound in view of its strong fungicide activity against dermatophytes such as Trichophyton rubrum, Trichophyton verrucosum, Trichophyton violaceum, Trichophyton schoenleinii, Microsporum canis, Microsporum audouinii and Epidermophyton floccosum. The imidazole derivatives of formula II are also useful as agricultural fungicides. They may, for instance, be used in the control of early blight of tomato and anthracnose disease of cucumber and as eradicants for powdery mildew of bean and apple.

For use as therapeutics the compounds of formula II may be used as such or as non-toxic acid addition or quaternary ammonium salts, i.e., salts which are not harmful to the animal organism when used in therapeutic doses. Such acid addition salts may be derived from inorganic acids, such as the hydrohalic acids (e.g., hydrochloric and hydrobromic acid) and sulphuric acid, and organic acids such as oxalic, maleic, tartaric, citric, acetic, lactic, succinic, fumaric and pamoic acids. The bases or non-toxic acid addition or quaternary ammonium salts thereof may be administered orally, parenterally or topically in a pharmacologically acceptable carrier according to accepted pharmaceutical practice. The dosage and mode of administration will depend on the mammalian species and the disease treated. In adult humans the oral dosage will be from 25 to 250 mg./kg. daily. For topical application, e.g., in the treatment of skin diseases, preparations such as salves, ointments, lotions or powders, containing from 0.1 to 5%, preferably to 2%, by weight of the active substance may be used.

When used for agricultural purposes the compounds of formula II and their acid addition and quaternary ammonium salts are advantageously used in formulations containing 0, 1–10 percent by weight of the active substance. Suitable amounts of the acitve substance to be applied range from 1–15 kg per hectare.

According to a feature of the invention the imidazole derivatives of formula II are prepared by reacting a compound of the general formula:

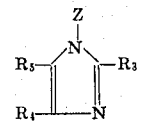

III wherein Z is a hydrogen, alkali metal or silver atom, and $R_3$, $R_4$ and $R_5$ are as hereinbefore defined, with a compound of the general formula:

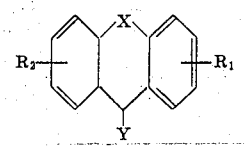

IV wherein Y represents the acid residue of a reactive ester, preferably a halogen atom or the toluene-p-sulphonate radical, and X, $R_1$ and $R_2$ are as hereinbefore defined. The reaction is preferably carried out by heating the reactants in an inert organic solvent such as benzene, toluene, xylene or dioxan. Improved yields can sometimes be obtained by using a solvent with a high dielectric constant, such as acetonitrile, dimethylsulphoxide or dimethylformamide.

When a compound of formula III is employed in which Z represents a hydrogen atom, the reaction is preferably carried out in the presence of a base, which may suitably be an excess of the compound of formula III. However, other bases such as potassium carbonate or tertiary amines (e.g., triethylamine) may also be used.

Alkali metal salts of the imidazole compounds of formula III may be prepared by reacting the corresponding compound of formula III in which Z is a hydrogen atom with a solution or suspension of the alkali metal or a hydride thereof in an inert organic solvent such as benzene or toluene, or with the appropriate alkoxide (e.g., methoxide) dissolved in an alcohol (e.g., methanol).

Compounds of formula III in which Z represents a silver atom may be prepared from those in which Z is hydrogen by the method described by G. Wyss, Ber. dtsch, chem. Ges., 10, 1373 (1877).

The reactive esters of formula IV can generally be obtained by reacting the corresponding alcohol (Y=OH) with the appropriate acid in manner known per se. The chlorides may be prepared by reacting the alcohol with thionyl chloride in manner known per se. From the halides the touene-p-sulphonates may be prepared by reaction with the silver salt of toluene-p-sulphonic acid. When X is a group -CH=CHal, the alcohol (Y=OH) can be obtained by reacting the corresponding 10,11-unsubstituted ketone with the appropriate halogen to obtain a 10,11-dihalo-10,11-dihydro compound, reacting the latter with sodium hydroxide and reducing the 10-halo-ketone so obtained with sodium borohydride according to the following reaction scheme:

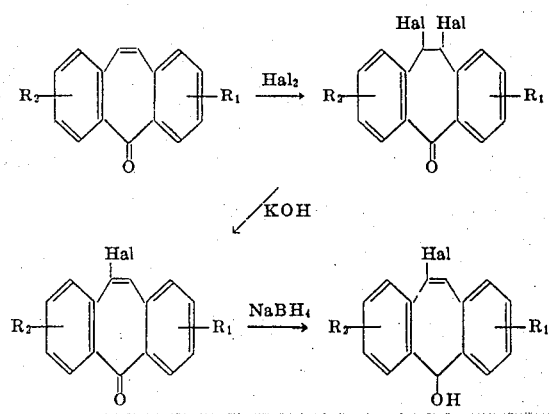

wherein $R_1$, $R_2$ and Hal are as hereinbefore defined.

Compounds of formula IV in which X is a group -CH=CCl and Y is a chlorine atom may be prepared by heating the corresponding 5-keto compound with phosphorus pentachloride.

Acid addition and quaternary ammonium salts of the compounds of formula II may be prepared by methods known per se. For example, the base may be treated with the equivalent amount of the acid in an inert solvent to obtain the corresponding acid addition salt, or the base may be treated with the equivalent amount of an appropriate alkyl halide or dialkyl sulphate in a solvent having high dielectric properties, for example acetonitrile, to obtain the quaternary ammonium salt.

By the term "methods known per se" as used in the specification is meant methods heretofore used or described in the literature.

The following Examples, in which the yields expressed are in terms of the theoretical yield, illustrate the preparation of the compounds of the present invention.

EXAMPLE 1

A solution of 22.6 g. (0.1 mole) of 5H-dibenzo[a,d]-cyclohepten-5-yl chloride in 150 ml. of anhydrous benzene is added drop-wise with stirring to a refluxing solution of 13.6 g (0.2 mole) of imidazole in 100 ml. of anhydrous benzene. The mixture obtained is refluxed for 3 hours. After cooling the reaction mixture is poured into water. The organic layer is separated, washed with water, dried over anhydrous sodium sulphate and concentrated by evaporation of the solvent. The residue is crystallized from methanol until a contstant melting point is obtained. 1-(5H-dibenzo[a,d]cyclohepten-5-yl)imidazole is obtained. Yield 50%. Melting point 199-201°C.

Analysis:
Calculated for $C_{18}H_{14}N_2$: 83.69% C; 5.46% H; 10.84% N
Found: 83.5 % C; 5.35% H; 10.0 % N

EXAMPLE 2

A solution of 23 g. (0.1 mole) of 10,11-dihydro-5H-dibenzo-[a,d]cyclohepten-5-yl chloride in 150 ml. of anhydrous xylene is added drop-wise with stirring to a refluxing solution of 13.6 g. (0.2 mole) of imidazole in 100 ml. of anhydrous xylene. The mixture obtained is refluxed for 3 hours. After cooling, the reaction mixture is poured into water. A solid substance is formed that is redissolved by adding chloroform. The organic layer is separated, washed with water, dried over anhydrous sodium sulphate and concentrated by evaporation of solvent. The residue is crystallized from toluene until the melting point remains constant. 1-(10,11-Dihydro-5H-dibenzo[a,d]cyclohepten-5-yl)imidazole is obtained. Yield 88%. Melting point 154°–156° C. The thin layer chromatogram shows one spot. The NMR spectrum is in accordance with the structure.

Analysis:
Calculated for $C_{18}H_{16}N_2$: 83.05% C; 6.19% H; 10.79% N
Found: 82.9 % C; 6.3 % H; 10.6 % N Addition of an equivalent amount of methyl iodide in a mixture of acetone and diethyl ether (1:1) to a solution of the base in the same solvent mixture gave the methoiodide, m.p. 189°–191° C.

EXAMPLE 3

A solution of 24.6 g. (0.08 mole) of 3-bromo-10,11-dihydro-5H-dibenzo[a,d]cyclohepten-5-yl chloride in 100 ml. of anhydrous toluene is added drop-wise to a refluxing solution of 11 g. (0.16 mole) of imidazole in 200 ml. of anhydrous toluene. The mixture is refluxed for 2 hours and then extracted with water. The organic solution is extracted three times with 2N hydrochloric acid, the acid extracts are made alkaline and extracted with toluene. The extract is dried over anhydrous sodium sulphate and concentrated by evaporation of solvent. The residue is crystallized from acetone and petroleum ether (boiling range 40°–60° C.). 1-(3-Bromo-10,11-dihydro-5H-dibenzo[a,d]cyclohepten-5-yl)imidazole is obtained. Yield 60%. Melting point 111°–113° C.

Analysis:

Calculated for $C_{18}H_{15}N_2Br$: 63.74% C; 4.46% H; 8.23% N

Found: 63.8 % C; 4.55% H; 8.35% N

EXAMPLE 4

Over a period of 20 minutes hydrogen chloride gas is passed through a solution of 23.0 g. (0.1 mole) of 6,7-dihydrodibenzo-[a,d]cycloocten-12-(5H)-ol. Afterwards the solution is dried with calcium chloride and concentrated by evaporation of solvent. The residue is dissolved in 150 ml. of anhydrous xylene and this solution is added drop-wise to a refluxing solution of 13.6 g. (0.2 mole) of imidazole in 100 ml. of anhydrous xylene. The mixture is refluxed for 3 hours, after which the reaction mixture is cooled and water is added. The aqueous layer is separated, and the xylenic layer is washed with water, dried over anhydrous sodium sulphate, filtered and concentrated by evaporation of solvent. The residue consists of crude 1-(5,6,7,12-tetrahydrodibenzo[a,d]cycloocten-12-yl)imidazole in a 92.5% yield. After crystallization from toluene the yield is 80%, and the product melts at 132°–133° C.

Analysis:

Calculated for $C_{19}H_{18}N_2$: 83.18% C; 6.61% H; 10.21% N

Found: 83.0 % C; 6.5 % H; 10.2 % N

EXAMPLE 5

A solution of 17 g. (0.09 mole) of 9-fluorenyl chloride in 100 ml. of anhydrous toluene is added drop-wise to a refluxing solution of 12.2 g. (0.18 mole) of imidazole in 100 ml. of anhydrous toluene. The mixture is refluxed for 2 hours, cooled and extracted with water. The organic layer is dried over sodium sulphate and concentrated by evaporation of solvent. The residue is dissolved in a little acetone and oxalic acid and diethyl ether are added until a precipitate is no longer formed. The solid substance is filtered off and crystallized from methanol and diethyl ether. The 1-(9-fluorenyl)imidazole hydrochloride obtained is converted into the free base by addition of 2N sodium hydroxide and the base is extracted with diethyl ether. The ethereal solution is dried over sodium sulphate and the ether is distilled off. The residue is crystallized from isopropanol to give 1-(9-fluorenyl)imidazole, melting at 136°–147° C., in a 20% yield.

Analysis:

Calculated for $C_{16}H_{12}N_2$: 82.73% C; 5.21% H; 12.06% N

Found: 82.6 % C; 5.2 % H; 12.2 % N

EXAMPLE 6

A solution of 22.9 g. (0.10 mole) of 10,11-dihydro-5H-dibenzo[a,d]cyclohepten-5-yl chloride in 100 ml. of anhydrous toluene is added drop-wise to a refluxing solution of 19.2 g. (0.09 mole) of 2-undecylimidazole and 15 ml. of triethylamine in 100 ml. of anhydrous toluene. The solution is refluxed for 9 hours and then cooled and extracted with water. The organic solvent is distilled off and petroleum ether (boiling range 28°–40°C.) is added to the residue. From the solution obtained 1-(10,11-dihydro-5H-dibenzo[a,d]cyclohepten-5-yl)-2-undecylimidazole crystallized and it was then recrystallized three times from acetone and petroleum ether (boiling range 28°–40° C.). Yield 45%. Melting point 117°–118° C.

Analysis:

Calculated for $C_{29}H_{38}N_2$: 84.01% C; 9.24% H; 6.76% N

Found: 84.2 % C; 9.2 % H; 6.8 % N

EXAMPLE 7

At a temperature of 15°C. 25 ml. of thionyl chloride are added drop-wise during the course of 1.5 hours to a solution of 63 g. (0.3 mole) of 10,11-dihydro-5H-dibenzo[a,d]cyclohepten-5-ol in 325 ml. of anhydrous benzene. The mixture is kept at room temperature for another hour and then the liquid is distilled off at 40° C. Remaining thionyl chloride is removed by adding 100 ml. of anhydrous benzene and distilling off the benzene again. The resulting crude 10,11-dihydro-5H-dibenzo-[a,d]cyclohepten-5-yl chloride weighing 68.6 g. (0.3 mole) is dissolved in 300 ml. of acetonitrile and the solution is added to a refluxing solution of 40.8 g. (0.6 mole) of imidazole in 150 ml. of acetonitrile. The mixture is refluxed for 5 hours. The solvent is distilled off and the residue is dissolved in toluene and washed with water until it is neutral. The toluene layer is dried over magnesium sulphate and concentrated, and the residue is crystallized from toluene. 65 g. of 1-(10,11-dihydro-5H-dibenzo[a,d]cyclohepten-5-yl)imidazole are obtained. Yield 85.5%. Melting point 154°–156° C.

Analysis:

Calculated for $C_{18}H_{16}N_2$: 83.05% C; 6.19% H; 10.79% N

Found: 82.9 % C; 6.3 % H; 10.6 % N

EXAMPLE 8

A solution of 26.5 g. (0.12 mole) of 10,11-dihydro-5H-dibenzo[a,d]cyclohepten-5-yl chloride in 75 ml. of methyl cyanide is added to a refluxing solution of 13.0 g. (0.12 mole) of 2-ethyl-4-methylimidazole and 15 ml. of triethylamine in 100 ml. of methyl cyanide. The solution is refluxed for 18 hours and then cooled and concentrated. To the residue toluene is added and the solution is extracted with water. The organic layers are dried over sodium sulphate and concentrated, and to the residue a solution of oxalic acid in diethyl ether is added. A precipitate of the oxalate of 1-(10,11-dihydro-5H-dibenzo-[a,d]cyclohepten-5-yl)-2-ethyl-4-methylimidazole is obtained. The oxalate is washed with diethyl ether, acetone and petroleum ether (boiling range 28°–40° C.), and then the base is liberated by addition of sodium hydroxide and extracted with diethyl ether. The extract is dried over sodium sulphate and the ether is distilled off. The residue is crystallized three times from petroleum ether (boiling range 100°–140° C.). Yield 20%. Melting point of base 125°–127° C.

EXAMPLE 9

A solution of 32.1 g. (0.105 mol) of 10-bromo-5H-dibenzo-[a,d]cyclohepten-5-yl chloride in 100 ml of anhydrous toluene is added dropwise to a refluxing solution of 25 g (0.35 mol) of imidazole in 100 ml of anhydrous toluene. The mixture is refluxed for half an hour and is then cooled and extracted with water. The toluene layers are dried over anhydrous sodium sulphate and the solvent is distilled off. The residue is crystallized from toluene. 1-(10-bromo-5H-dibenzo-[a,d]-cyclohepten-5-yl)imidazole is obtained, m.p. 194°–195° C.

EXAMPLE 10

A mixture of 30 g (0.147 mol) of 5H-dibenzo[a,d]-cyclohepten-5-one and 30 g (0.144 mol) of phosphorus pentachloride are heated for 2 hours at 160° C. Benzene is added to the product obtained and then the benzene and the volatile substances present are distilled off. The residue is extracted with benzene, the solvent is distilled off and the product obtained is crystallized three times from hexane. 5,10-Dichloro-5H-dibenzo[a,d]cycloheptane is obtained, m.p. 115°–118° C.

14.7 g (0.056 mol) of this compound, dissolved in 50 ml of anhydrous toluene, is added over the course of 10 minutes to a refluxing solution of 7.62 g (0.112 mol) of imidazole in 50 ml of anhydrous toluene. The mixture is refluxed for 4 hours. After cooling, the clear solution obtained is washed three times with water, dried over anhydrous sodium sulphate and concentrated by evaporation of solvent. The product is taken up in 2N hydrochloric acid and extracted with diethyl ether. The aqueous layer is made alkaline by adding a 2N sodium hydroxide solution and is then extracted with chloroform. The extract is dried over anhydrous sodium sulphate, the chloroform is distilled off and the residue is crystallized five times from toluene. 1-(10-Chloro-5H-dibenzo[a,d]-cyclohepten-5-yl)imidazole is obtained, m.p. 122.5° C.

EXAMPLE 11

9 g (0.031 mole) of 1-(10-chloro-5H-dibenzo[a,d]-cyclohepten-5-yl)imidazole are dissolved in 100 ml of ethanol. 5 ml 10N sodium hydroxide and 300 mg of palladium/charcoal catalyst (Pd content 5%) are added and hydrogen is passed into the solution at atmospheric pressure. 730 ml of hydrogen are taken up. The catalyst is filtered off, the solvent is evaporated and the residue is dissolved in 2N hydrochloric acid. The solution is made alkaline with 2N sodium hydroxide and extracted with chloroform. The extract is dried over anhydrous sodium sulphate, the solvent is distilled off and the residue is crystallized from methanol. 5 g of 1-(5H-dibenzo[a,d]cyclohepten-5-yl)imidazole are obtained. Melting point 198.5° – 201.5° C.

EXAMPLE 12

50 g of 1-(5H-dibenzo[a,d]cyclohepten-5-yl)imidazole (sieved through a 40 mesh sieve), 50 g of Avicel PH 101 (microcrystalline cellulose) and 1 g of Aerosil (highly purified silicon dioxide) are mixed together and soft gelatin capsules are filled each with 101 mg of the mixture so that each capsule contains 50 mg of active substance.

EXAMPLE 13

A solution of 24 g (0.11 mole) of 10,11-dihydro-5H-dibenzo[a,d]cyclohepten-5-yl chloride in 75 ml of anhydrous acetonitrile is added dropwise to a refluxing solution of 8.6 g (0.11 mole) of 2-methylimidazole and 10.1 ml of triethylamine in 100 ml of acetonitrile. The solution is refluxed for 12 hours and is then cooled and concentrated by evaporation of the solvent. The residue is dissolved in toluene and the solution obtained is thrice extracted with water. The insoluble material is filtered off, the toluene layer is dried over anhydrous sodium sulphate and the solvent is distilled off. The residue and the insoluble material are combined and crystallized from a mixture of chloroform and diethyl ether and a mixture of ethanol and diethyl ether. 1-(10,11-Dihydro-5H-dibenzo[a,d]cyclohepten-5-yl)-2-methylimidazole is obtained with melting point 215°–217° C.

What is claimed is:

1. A compound having the formula:

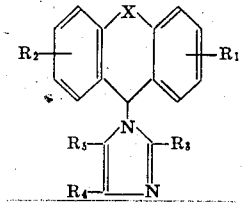

wherein the symbols $R_1$ and $R_2$ are the same or different and each represents hydrogen, halogen or lower alkyl; $R_3$, $R_4$ and $R_5$ are the same or different and each represents hydrogen or lower alkyl, X represents a single bond, a $-CH_2-CH_2-$, $-CH_2-CH_2-CH_2-$, $-CH=CH-$ or $-CH=CH$ Hal-, wherein Hal represents a chlorine or bromine, or a non-toxic acid addition or non-toxic quaternary ammonium salt thereof.

2. A compound in accordance with claim 1, wherein X is a $-CH_2-CH_2-$, $-CH=CH-$ or $-CH=CHal$.

3. A compound in accordance with claim 1 having the name 1-(10-chloro-5H-dibenzo[a,d]cyclohepten-5-yl) imidazole or a non-toxic acid addition or non-toxic quaternary ammonium salt thereof.

4. A compound in accordance with claim 1 having the name 1-(5H-dibenzo[a,d]cyclohepten-5-yl)imidazole or a non-toxic acid addition or non-toxic quaternary ammonium salt thereof.

5. A compound in accordance with claim 1 having the name 1-(10,11-dihydro-5H-dibenzo[a,d]cyclohepten-5-yl) imidazole or a non-toxic acid addition or non-toxic quaternary ammonium salt thereof.

* * * * *

UNITED STATES PATENT OFFICE
CERTIFICATE OF CORRECTION

Patent No. 3,764,609                             Dated  Oct. 9, 1973

Inventor(s)  Cornelis van der Stelt

It is certified that error appears in the above-identified patent and that said Letters Patent are hereby corrected as shown below:

The title should read as follows:
--1-(Dibenzo[a,d]cyclohepten-5-yl), 1-(10,11-Dihydro-dibenzo-[a,d]cyclohepten-5-yl) and 1-(Dibenzo[a,d]cyclooctanyl)imidazole Column 1, line 47, after "group with at most" insert --12 carbon atoms--.

Column 3, line 25, "touene" should read --toluene--.

Signed and sealed this 19th day of March 1974.

(SEAL)
Attest:

EDWARD M. FLETCHER, JR.           C. MARSHALL DANN
Attesting Officer                 Commissioner of Patents